United States Patent
Kawamoto

[19]
[11] Patent Number: 6,108,554
[45] Date of Patent: *Aug. 22, 2000

[54] INFORMATION PROVIDING SYSTEM

[75] Inventor: Yoji Kawamoto, Tokyo, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/771,679

[22] Filed: Dec. 23, 1996

Related U.S. Application Data

[63] Continuation-in-part of application No. 08/557,625, Nov. 14, 1995.

[30]    Foreign Application Priority Data

Dec. 26, 1995   [JP]   Japan  ................................. 7-338548

[51] Int. Cl.$^7$ ...................................................... H04Q 7/20
[52] U.S. Cl. .......................... 455/456; 455/31.2; 455/414
[58] Field of Search .................................. 455/403, 404, 455/414, 417, 422, 456, 457, 550, 31.2, 31.3, 38.1; 379/88.17, 93.01, 93.12

[56]    References Cited

U.S. PATENT DOCUMENTS

| | | | |
|---|---|---|---|
| 4,737,977 | 4/1988 | Norman | 455/456 |
| 5,438,609 | 8/1995 | Yahagi | 455/458 X |
| 5,515,419 | 5/1996 | Sheffer | 455/456 |
| 5,555,446 | 9/1996 | Jasinski | 455/31.2 X |
| 5,561,704 | 10/1996 | Salimando | 455/456 |
| 5,673,305 | 9/1997 | Ross | 455/404 X |
| 5,732,383 | 3/1998 | Foladare et al. | 455/422 X |
| 5,752,186 | 5/1998 | Malackowski et al. | 455/414 |

*Primary Examiner*—William G. Trost
*Attorney, Agent, or Firm*—Frommer Lawrence & Haug, LLP.; William S. Frommer; Gordon Kessler

[57]    ABSTRACT

An information providing system capable of effectively offering a desired service. In this system, when the user uses a portable terminal to issue a request for a desired service toward a base station, a given server receives this service request through a simplified portable telephone system network and then transmits it, for example, to a client which can respond to the service request of the user. The client sends reply information through the server to the portable terminal. The user makes the service request to the client when the user decides, on the basis of the reply information, that the desired service is attainable from the client.

7 Claims, 12 Drawing Sheets

FIG. 6

| BASE STATION ID | LOCATION | |
| --- | --- | --- |
| | NORTH LATITUDE | EAST LONGITUDE |
| 0001 | 35°55'20" | 135°15'19" |
| 0002 | 35°55'25" | 135°15'25" |
| 0003 | 35°55'30" | 135°15'20" |
| 0004 | 35°55'50" | 135°15'55" |
| 0005 | 35°55'10" | 135°15'05" |
| ⋮ | ⋮ | ⋮ |

FIG. 12A

| AREA | PORTABLE TERMINAL ID |
|---|---|
| 1 | 1025, 0010, 2100 3154, 6521, 5309 |
| 2 | 6111, 5321, 4416 5719, 0195, 3310 |
| 3 | 5670, 2231, 2615 4991, 6320, 3313 |
|  |  |

FIG. 12B

| AREA | NORTH LATITUDE | EAST LONGITUDE |
|---|---|---|
| 1 | 35°55'00"~ 35°56'11" | 132°15'20"~132°15'55" |
| 2 | 35°55'15"~ 35°59'05" | 132°16'10"~132°17'50" |
| 3 | 35°56'19"~ 35°58'55" | 132°17'50"~132°18'01" |
|  |  |  |

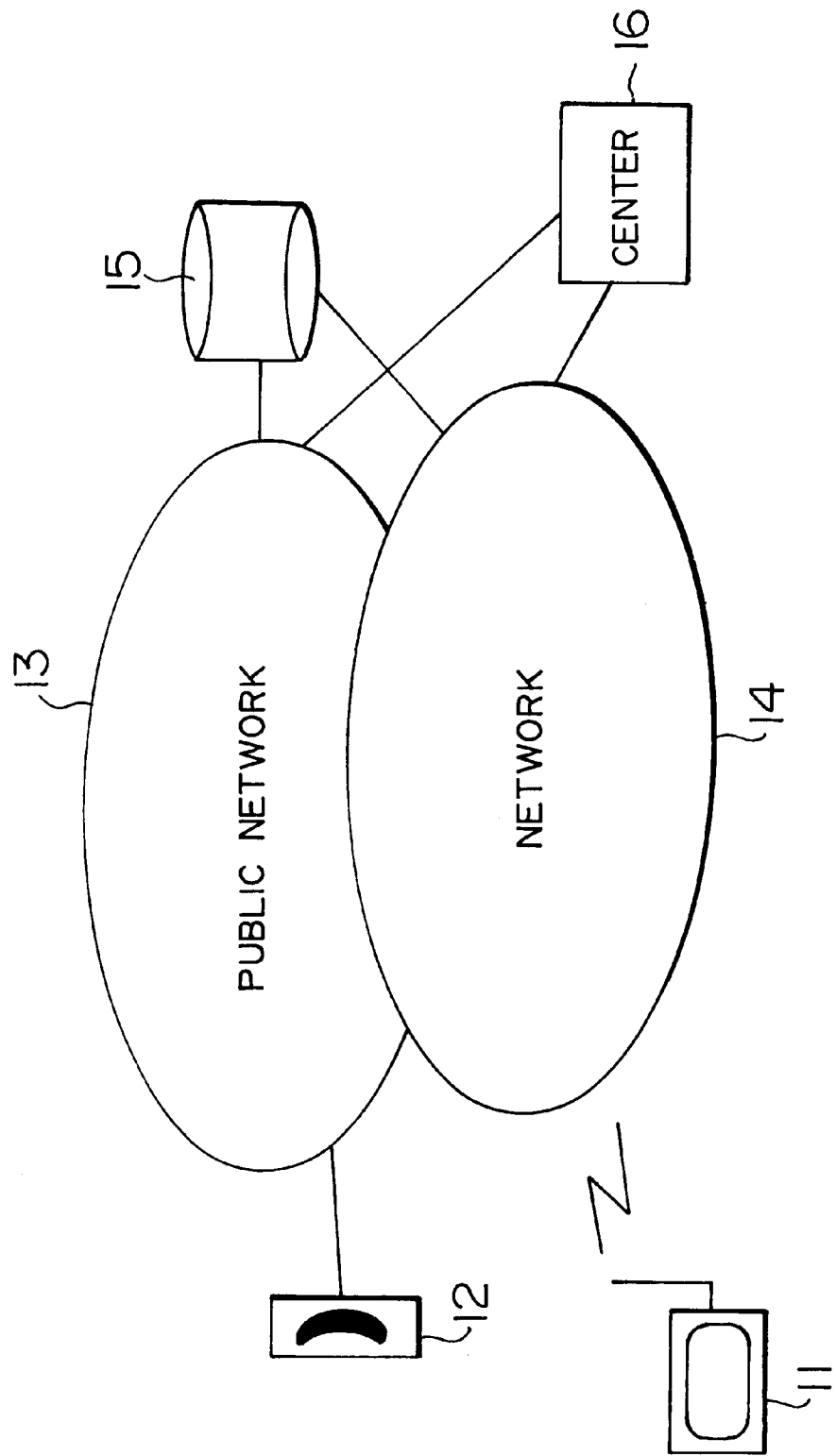

INFORMATION PROVIDING SYSTEM

CROSS-REFERENCE TO RELATED APPLICATIONS

This application is a continuation-in-part of copending U.S. application Ser. No. 08/557,625 filed Nov. 14, 1995.

BACKGROUND OF THE INVENTION

1. Field of the Invention

The present invention relates to an information providing or distribution system, and more particularly to an information providing system suitable, for example, for a simplified portable telephone system.

2. Description of the Related Art

FIG. 13 is a conceptual illustration of a prior information providing system. A portable terminal 11 such as a portable telephone has the ability to accept a network service a radio communication enterpriser offers and to gain access through a network 14 to a database 15 or a center 16. In addition, a public telephone 12 is also accessible through a public network 13 to the same database 15 or center 16. In order for a subscriber (user) to a given information providing system to attain the currently necessary information, as shown in FIG. 13, commonly the subscriber uses the portable terminal 11 to gain access through the network 14 to the database 15 or employs the public telephone 12 to obtain access through the public network 13 to the database 15. In response to the user accessing the database 15 and making a request thereto through the use of the public telephone 12, the database 15 retrieves given service information according to this request and transmits it through the public network 13 to that public telephone 12. On the other hand, when the user uses the portable terminal 11 to have access to the database 15 for a given request thereto, the database 15 also retrieves given service information according to this request and sends it through the network 14 to the portable terminal 11. At this time, the line between the database 15 and the public telephone 12 or the portable terminal 11 the user is now using stays in the connecting condition until the database 15 replies to the user.

Secondly, a description will be made hereinbelow of a taxi taking system being one example of an information providing system in which the user transmits his present location and the information, the user needs, to the center 16 and the center 16 transmits the necessary information to the present location. The user who wants to take a taxi uses the public telephone 12 or the portable terminal 11 to establish a contact with the center 16 of a taxi company for taking a taxi. In response to the contact from the user, the center 16 of the taxi company makes communications with the taxis belonging to this company and selects one taxi taking into consideration whether or not the distance to the user's present location is the shortest or whether or not the user's location lies in the route and then informs the user of the arrival time of that taxi.

However, in the case of the above-described prior information providing system, in many cases the user does not know the telephone number of the center 16 and, hence, needs to find out the telephone number of the center 16 using a means such as a telephone book unrelated to this information providing system. In addition, since the center 16 separately exists at every enterpriser, in cases where, for example, one center 16 turns down the offer of the given information or service to the user, the user has to continuously make a request for the offer of the necessary information or service toward centers (not shown) different from the aforesaid center 16, which is a great burden on the user.

Furthermore, in cases where the user requests the offer of desired information from the center 16, the conversation condition therebetween reluctantly continues until the center 16 sends its reply to the user, with increased charge or fee and deteriorated condition in economics. Still further, if the access charge to the database 15 is determined on the basis of the use time, it can come to a relatively large amount. Moreover, since the center 16 can not know the user's present location until receiving it from the user, the user needs to tell his present location on all such occasions, which is also a great burden on the user.

SUMMARY OF THE INVENTION

Accordingly, the present invention has been developed with a view to eliminating these problems, and it is an object of this invention to provide an information providing system which is capable of, when the user requests the desired information or service, lightening the burden on the user side concurrently with reducing the charge and further capable of quickly offering information or a service to the present location of the user.

In accordance with an aspect of the present invention, in an information providing system, a terminal comprises detection means for detecting a location of the terminal, transmission means for transmitting request information including location information on the location detected by the detection means, an identification number for identifying the terminal and additional information indicative of the contents of a request to a server, reception means for receiving reply information responsive to the request information, and control means for controlling the transmission means and the reception means.

Furthermore, in accordance with another aspect of this invention, in an information providing system, a server comprises reception means for receiving request information including location information on a location of a terminal, identification information for identifying the terminal and additional information representative of the contents of a request from the terminal, judgment means for judging or deciding the contents of the request from the terminal, and transmission means for transmitting reply information responsive to the request information on the basis of the judgment result by the judgment means.

In the first-mentioned information providing system, the detection means detects the location of the terminal and subsequently the transmission means transmits the request information including the location information on the location detected by the detection means, the identification number for identifying the terminal, and the additional information indicative of the contents of a request to the server. Further, the reception means receives the replay information responsive to the request information from the server. The transmission means and the reception means operate under control of the control means.

In the second-mentioned information providing system, the reception means receives the request information including the location information on the location of the terminal, the identification number for identifying the terminal and the additional information representative of the content of the request from the terminal, while the judgment means judges the contents of the request from the terminal so that the transmission means transmits the reply information responsive to the request information on the basis of the judgment result by the judgment means.

The above, and other, objects, features and advantage of the present invention will become readily apparent from the following detailed description thereof which is to be read in connection with the accompanying drawings.

BRIEF DESCRIPTION OF THE DRAWINGS

FIG. 6 is an illustration of an example of a table showing the corresponding relation between a base station ID and a location;

FIG. 12 is an illustration of an example of a table showing the corresponding relation between a registered location of a portable terminal and the present location; and FIG. 13 illustrates an arrangement of an example of a prior information providing system.

DESCRIPTION OF THE PREFERRED EMBODIMENTS

Figure 1:
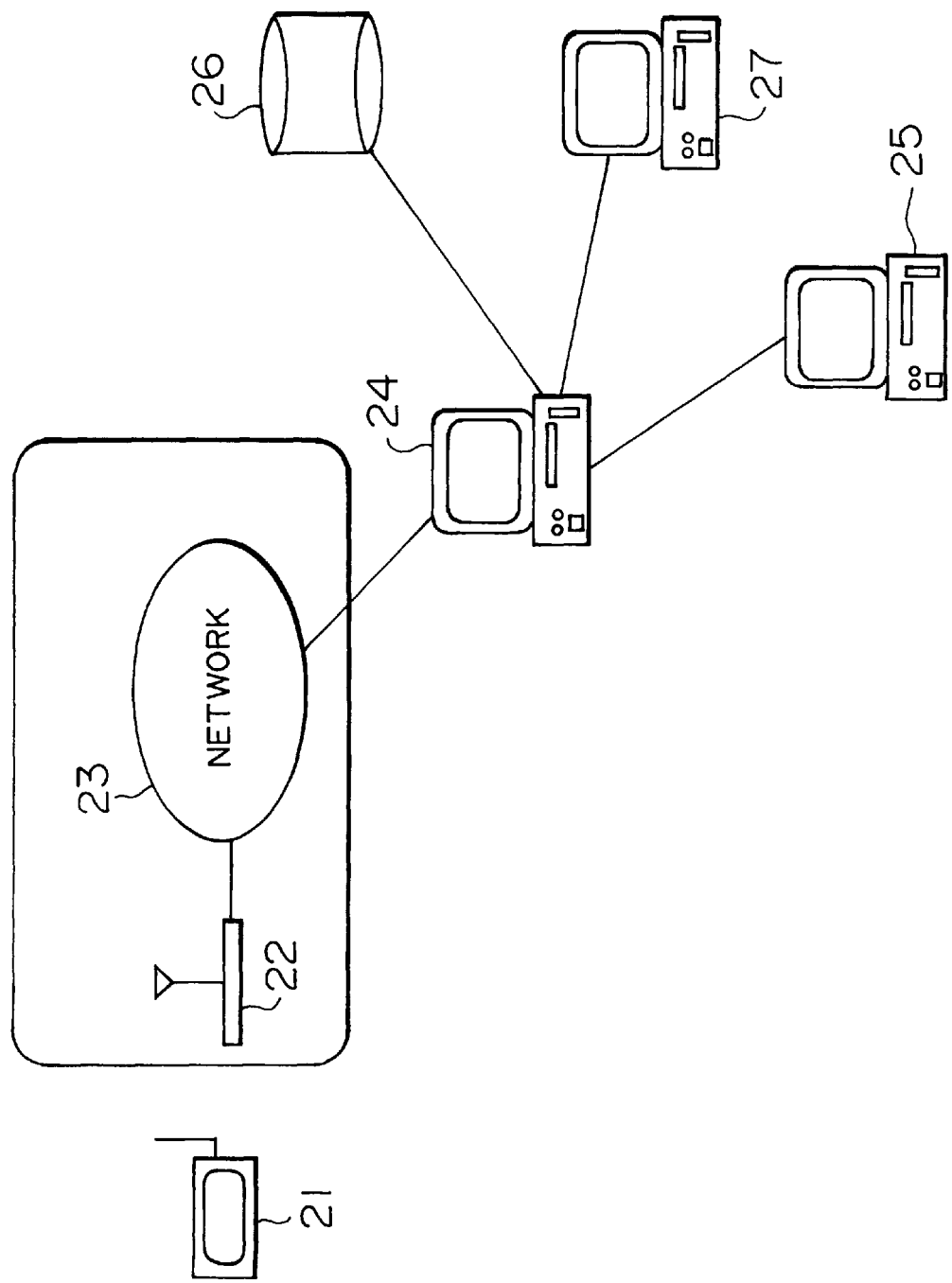
FIG. 1 is an illustration of an arrangement of an information providing system according to an embodiment of the present invention.

FIG. 1 is an illustration of an arrangement of an information providing system according to an embodiment of the present invention. A portable terminal 21 subscribes for a simplified portable telephone system (hereinafter referred to as PHS: Personal Handy Phone System) to have access through a base station and a simplified portable telephone system network 23, the enterpriser possesses, to a server 24 connected through a given dedicated cable or the like thereto. The server 24 processes an agent transmitted from the user (subscriber), i.e., request information including the identification number of the base station 22 closest to the present location of the user, the subscriber number of the user and an additional information, and it gains access to a database 26, a subserver 25 or a client 27 (which will be described later) in accordance with the process result. The subserver 25 processes the agent transmitted from the server 24, the database 26 accumulates information, and the client 27 receives a service request agent from the server 24 in which a given request item is added as additional information and performs a replay process therefor.

Figure 2:
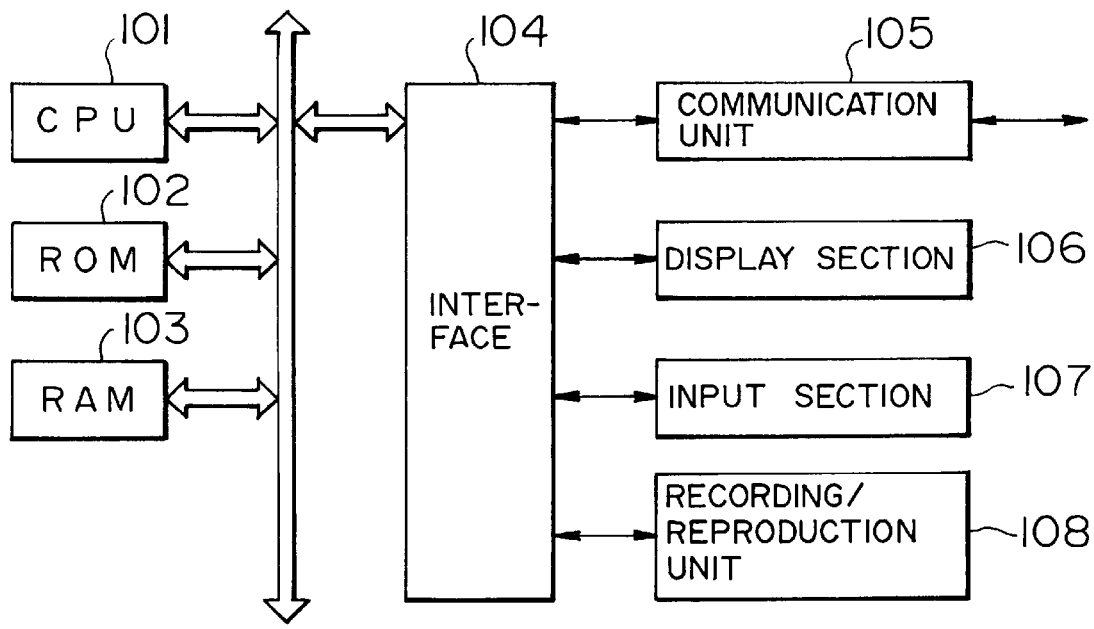
FIG. 2 is a block diagram showing an example of an arrangement of a portable terminal (21) of FIG. 1.

FIG. 2 is a block diagram showing an example of an arrangement of the portable terminal 21 of FIG. 1. A CPU (control means, detection means) 101 executes various operations in accordance with programs stored in a ROM 102. The ROM 102 further stores the ID number of the portable terminal 21. A RAM 103 suitably stores data or the like necessary when the CPU implements the various operations. An input section 107 suitably works when inputting given instructions to the CPU 101, and a display section 106 is composed of, for example, a liquid crystal display or the like and is designed to display given characters, graphic patterns or pictures. Further, a recording/reproduction unit 108 records and reproduces given data on and from a recording medium such as a magnetic disk, a magneto-optical disk and an IC card. Still further, a communication unit (transmission means, reception means) 105 transmits data toward the base station 22 or receives data fed through the base station 22. An interface 104 is situated between the CPU 101 and the communication unit 105 to the input section 107 to take charge of the interface operations.

Figure 3:
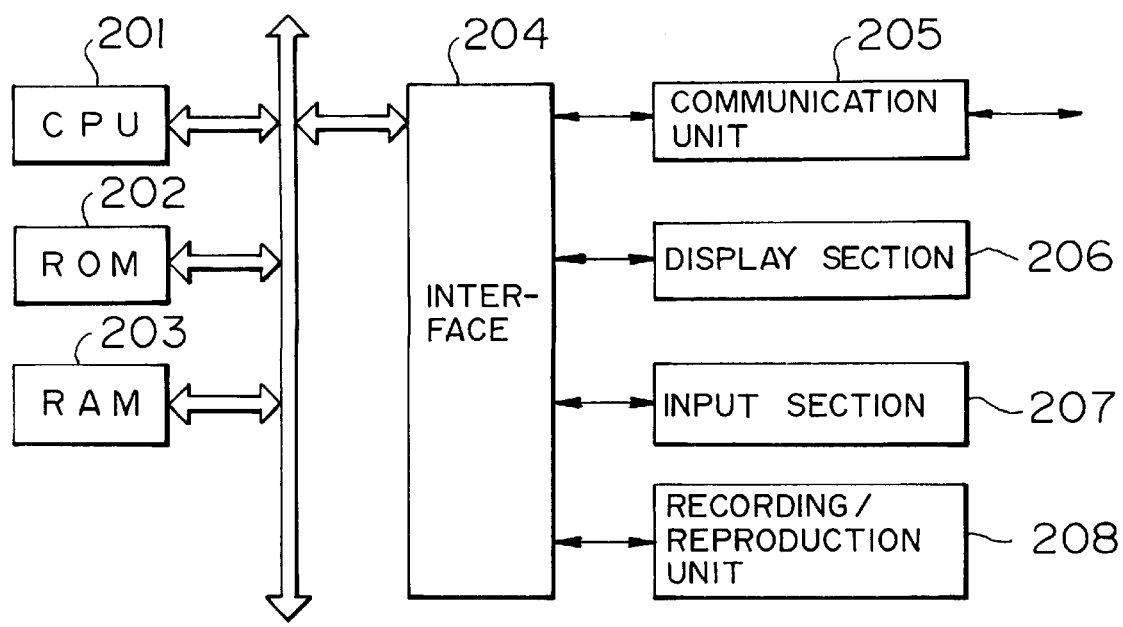
FIG. 3 is a block diagram showing an example of an arrangement of a server of FIG. 1.

FIG. 3 is a block diagram showing an example of an arrangement of the server 24. A CPU (judgment means, reply content judgment means, request means) 201 conducts various operations in accordance with programs put in a ROM 202. A RAM 203 suitably stores data or the like necessary when the CPU 201 implements the various operations. An input section 207 suitably operates when inputting given instructions to the CPU 201, while a display section 206 is made up of, for example, a CRT or liquid crystal display and designed to display given characters, graphic patterns or pictures. Further, a recording/reproduction unit 208 records and playbacks given data on and from a recording medium such as a magnetic disk, a magneto-optical disk and an IC card. A communication unit (reception means, transmission means, transfer means) 205 transmits data toward the base station 22 or receives data fed through the base station 22. An interface 204 lies between the CPU 201 and the communication unit 205 to the input section 207 to accomplish the interface process.

Thus, the server 24 basically has the same arrangement as that of the FIG. 2 portable terminal 21 except for the scale, the processing performance and the processing speed. Further, the arrangements of the subserver 25, the client 27 and the database 26 basically have the same arrangement as that of the FIG. 3 server 24, and hence the illustration and description thereof will be omitted for brevity.

Figure 4:
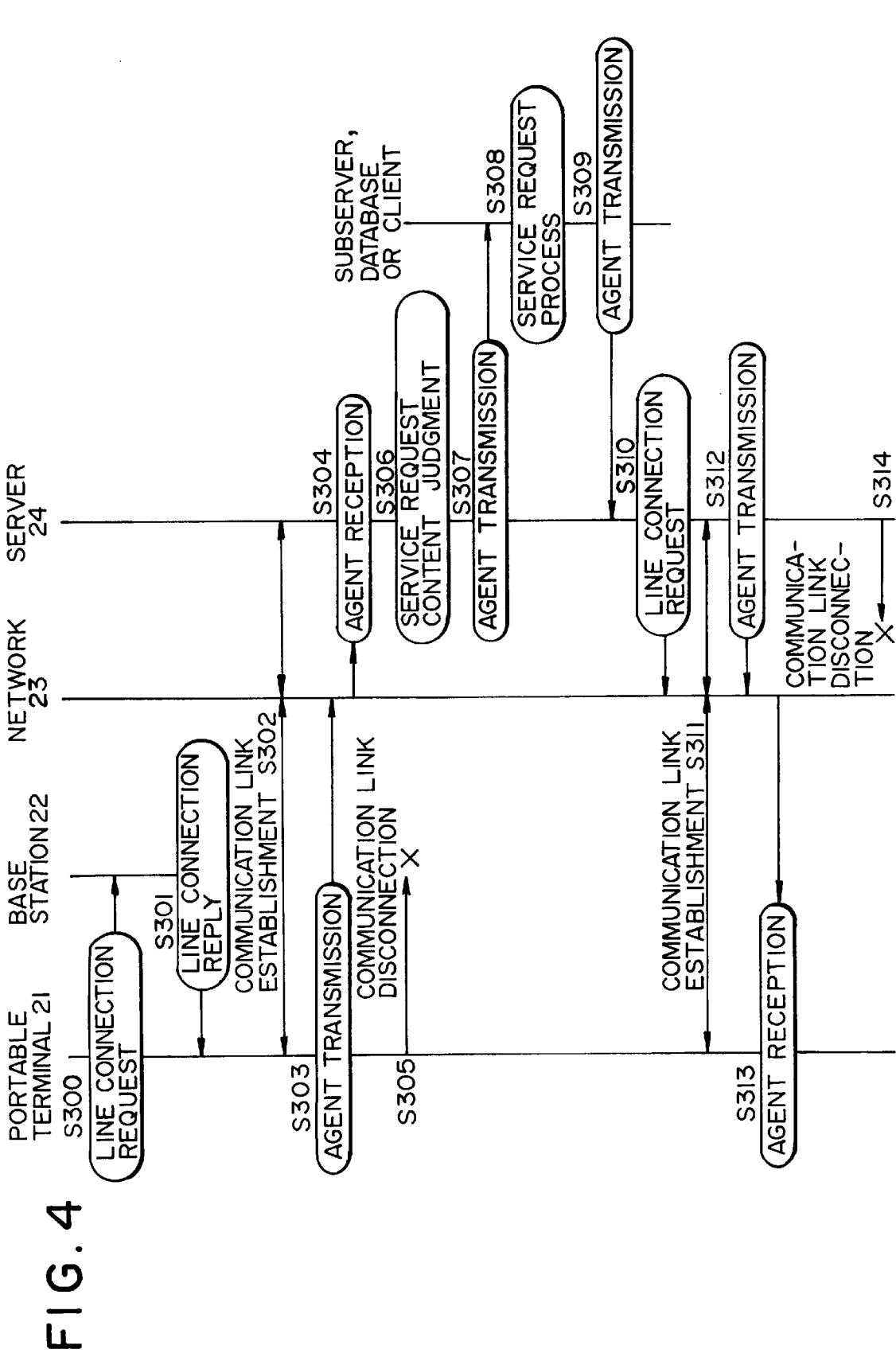
FIG. 4 is a flow chart showing an example of an operation of the FIG. 1 embodiment.

FIG. 4 is a flow chart showing an example of an operation of the FIG. 1 embodiment. Referring to FIGS. 1 to 4 a description will be taken hereinbelow of the operation of this embodiment. When the user tries to receive information or service from a service providing company, the user uses the portable terminal 21 to have access to the server 24 the service providing company possesses. At this time, first, at step S300 the communication unit 105 of the portable terminal 21, being under the control of the CPU 101, transmits a line connection request to the nearest base station 22 to establish a radio link channel between the portable terminal 21 and the nearest base station 22. After the establishment of the radio link channel, at step S301 the base station 22 transmits to the portable terminal 21 a radio link establishment reply (line connection reply) representative of the fact of the establishment of the radio link channel, with the result that at step S302 (detection means) the establishment of a communication link takes place to allow the conversation and the transmission and reception of data between the portable terminal 21 and the server 24 by way of the simplified portable telephone system network 23. Further, at this time, the CPU 101 accepts a base station ID number (an identification number for identifying the base station) of the radio link established base station 22 as the information indicative of the present location.

Secondly, at step S303 (transmission means) the communication unit 105 of the portable terminal 21, being under the control of the CPU 101, transmits a service request agent through the simplified portable telephone system network 23 to the server 24. This service request agent, as mentioned before, is composed of the base station ID number of the base state 22 establishing the radio link (obtainable at step S302), the subscriber number of the user (the identification number for identifying the terminal 21, and stored in the ROM 102), and additional information indicative of the contents of a request at every kind of service (inputted through the input section 107). Incidentally, for classifying the services at every kind, various keys of the portable terminal 21 are assigned to the service kinds so that the service kinds are inputted through the operation of the keys or selectively inputted from a menu displayed on the display section 106.

Furthermore, at step S304 (reception means) the communication unit 205 of the server 24 receives the service request agent from the portable terminal 21. Further, at step S305 the CPU 101 of the portable terminal 21 controls the communication unit 105 to disconnect the communication link. It is also possible that the communication unit 205 of the server 24 achieves this communication link disconnection. This disconnection can save the charge corresponding to the use time, such as the conversation charge or the rental fee. Subsequently, at step S306 (judgment means) the CPU 201 of the server 24 recognizes the service the user requests, on the basis of the service request agent the communication unit 205 receives from the portable terminal 21, then followed by step S307 (request means) where the communication unit 205 transmits the agent including the base station ID number, the subscriber number and the additional information from the user toward the serviceable database 26, subserver 25 and client 27 (or other units).

In cases where the destination of this agent from the server 24 is the database 26, at step S308 the CPU 201 of the database 26 executes a necessary operation to reply to the service request of the user, then followed by step S309 in which the communication unit 205 thereof sends the agent including the service request reply information (also including the base station ID number, the subscriber number of the user, and the additional information) to the server 24. On the other hand, in cases where the destination of the agent from the server 24 is the client, a plurality of clients exists and, hence, at step S307 the agent is sent to all the clients. The CPU 201 of each of the clients, at step S308, performs an necessary operation to reply to the service request of the user. Subsequently, the control advances to step S309 where the communication unit 205 transmits the agent including the service request reply information to the server 24.

On receiving the agent from each client, the server (reply content judgment means) 24 selects all the service request reply information or selects the client information agreeing with the service request condition from the user to produce a reply message to the user. In cases where the destination of the agent from the server 24 is the subserver 25, the subserver 25 transmits the service request agent from the user to a plurality of clients (not shown) coupled thereto, and after receiving a reply agent from the client, selects all the service request reply information included therein or selects the client information matching with the service request condition from the user to transmit the selection result as the reply agent to the server 24.

Figure 5:
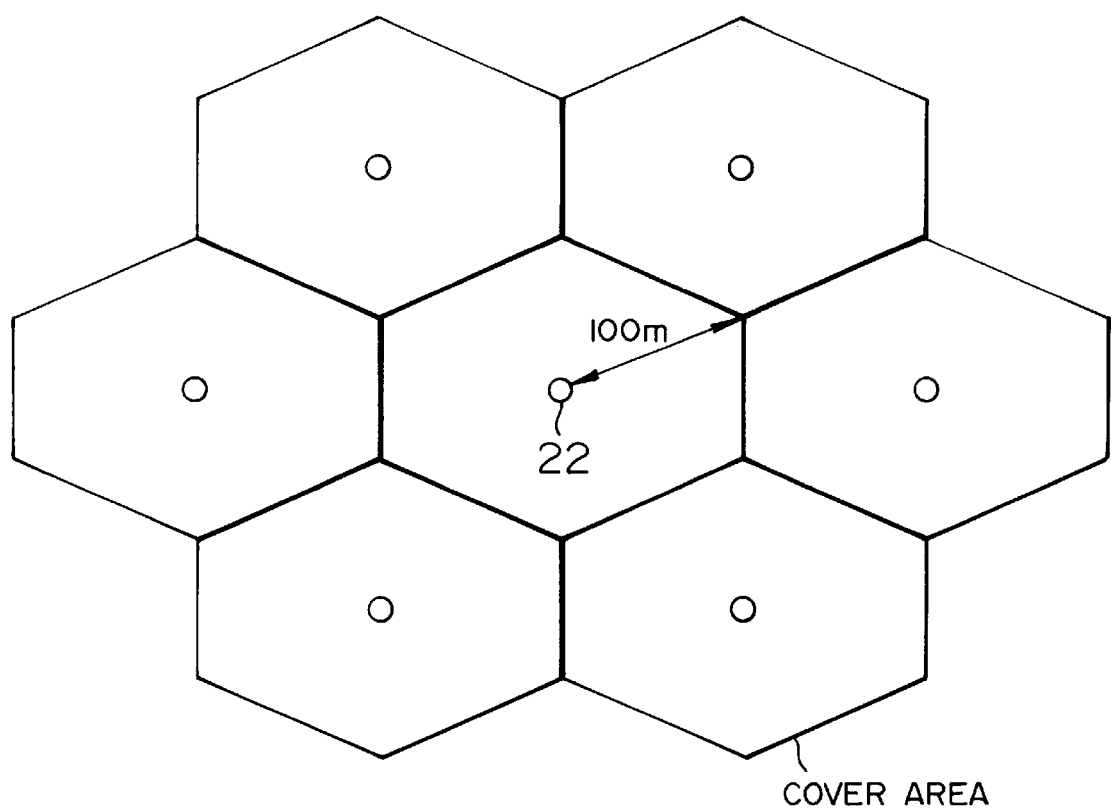
FIG. 5 is an illustration of a covering area of a base station of a simplified portable telephone system.

The CPU 201 of the client 27 or the database 26 decides the present location of the user on the basis of the base station ID number included in the agent from the user. As shown in FIG. 5 the radius of the cover area of the PHS base station 22 is approximately 100 m, which means that the user may stand within the area with a radius of 100 m centering around the base station 22 which sets up the radio link with the portable terminal 21. However, in this case, it is necessary that, for example, as shown in FIG. 6 the base station ID numbers and the locations including the longitudes, the latitudes and addresses corresponding thereto are recorded in advance in the recording/reproduction unit of the client 27 or the database 26 so that it is possible to know the location of the base station with the given base station ID number.

Thus, when the necessary reply information comes in the server 24, the control proceeds to step S310 in which the communication unit 205 of the server 24, controlled by the CPU 201, makes a line connection request toward the simplified portable telephone system network 23 for the transmission of the reply information to the portable terminal 21. Subsequently, after the communication link comes into the established condition at step S311, at step S312 (transmission means, transfer means) the agent including the service reply information goes to the portable terminal 21. Further, step S313 (reception means) the communication unit 105 of the portable terminal 21 receives the agent transmitted from the server 24, and when the CPU 201 of the server 24 confirms this reception, at step S314 the CPU 201 of the server 24 gives instructions to the communication unit 205 to cut off the communication link. According to the instructions from the CPU 201, the communication unit 205 disconnects the communication link. The portable terminal 21 can also perform this communication link disconnection instead.

Accordingly, if the user only has access to a given server 24 to make a given service request, the present location of the user is recognized automatically (without particularly predetermined input), so that the user can attain the reply information responsive to this service request from the serviceable client 27, subserver 25 or database 26. This reply information can also be recorded in the recording/reproduction unit 108 of the portable terminal 21. In this instance, the information recorded is appropriately reproduced to be displayed on the display section 106 before being put to use. Further, if the reply information received is a telephone number, the telephone number can be used to gain access to the desired client or database to receive the necessary service. At this time, the communication link disconnection state continues until the return of the reply information after the access is set up through the portable terminal 21 to the client 27, the subserver 25 or the data base 26, which can meanwhile contribute to saving the line use charge or the access charge.

Figure 7:
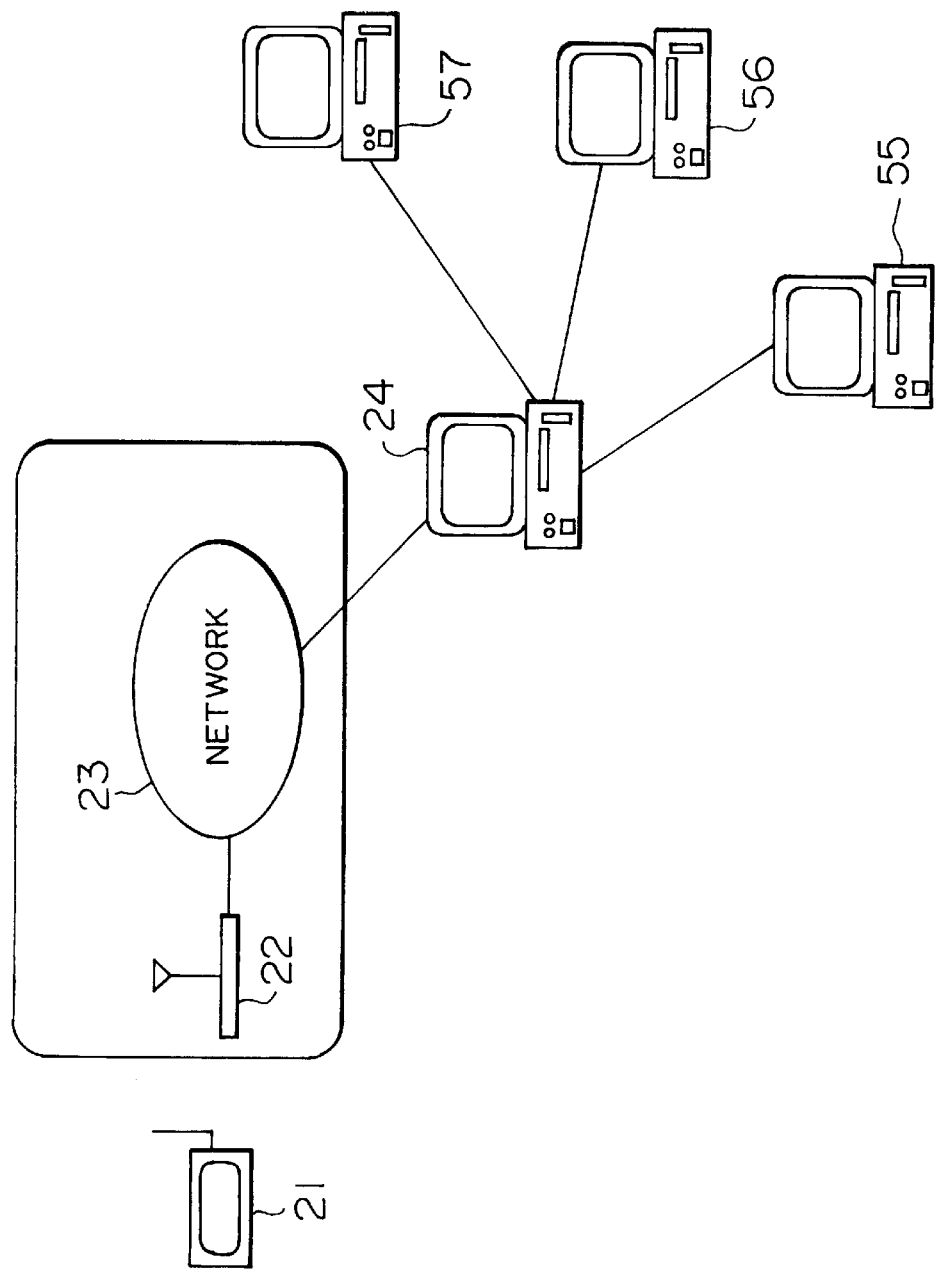
FIG. 7 is an illustration of an example of an arrangement of a taxi taking system based upon an information providing system according to this invention.

Furthermore, referring to FIG. 7, a description will be made hereinbelow of a taxi taking service system based upon an information providing system according to this invention. In FIG. 7, clients 55 to 57 are coupled to the server 24 of FIG. 1 embodiment. The clients 55 to 57 belong to taxi companies, respectively. The other arrangement is the same as that of the FIG. 1 embodiment, and the description thereof will be omitted for simplicity.

In operation, first of all, the user, who wants to take a taxi, operates the portable terminal 21 to transmit to the server 24 a service request agent (including the ID number of the nearest base station and the subscriber number of the user) including the service-kind separated additional information indicative of the intention of taking a taxi. At this time, the additional information can include the desire of quickly taking a taxi anyway. When the server 24 receives this service request agent from the user, the CPU 201 thereof recognizes, on the basis of the kind of service included in the additional information, the face that the service requested from the user is a taxi taking service, and makes the communication unit 205 transmit the agent including the information corresponding to the request of the user to each of the clients 55 to 57 which are connected thereto and which can offer the taxi taking service.

The client 55, receiving the agent from the server 24, roughly decides, on the basis of the base station ID number, where the user exists and communicates the decision result through a communication unit of the MCA (Multi-Channel Access) or the like to all taxis that company possesses. The taxi receives the information on the user's desire and the rough present location of the user and, if possible to go to the location of the user, communicates through the MCA with the client 55. If finding out the taxi which can go to the user's location, the client 55 transmits to the server 24 the agent including the reply information such as the contact way with the client 55 (telephone number) and the arrival time of the taxi as the additional information. On the other hand, in the case that there is no taxi which can reach the user, it transmits the agent including the information indicative of that fact to the server 24. The clients 56 and 57 perform the same operation as that of the client 55, and the description thereof will be omitted.

The server 24 retrieves all the reply information included in the additional information of the agent from the respective clients 55 to 57 which coincide with the request of the user or which almost coincide therewith and transmits the retrieval result through the simplified portable telephone system network 23 to the portable terminal 21 the user possesses. Depending upon this reply information, the user having the portable terminal 21 receiving the reply information from the server 24 communicates the detail location information through the PHS or the like to the client the user desires, and takes a taxi at the time the client designates.

This embodiment is applicable not only to the taxi taking service but also to other services. More specifically, in the case of desiring the other services, a service request agent in which the kind of service is included in the additional information is sent to the server 24. If receiving this service request agent, the server 24 recognizes the kind of service the user desires, on the basis of the kind of service included in the additional information of the service request agent. After that, the server 24 transmits this agent to the database, client or subserver which can offer this service. With this operation, it is possible to cope with a variety of service requests.

Figure 8:
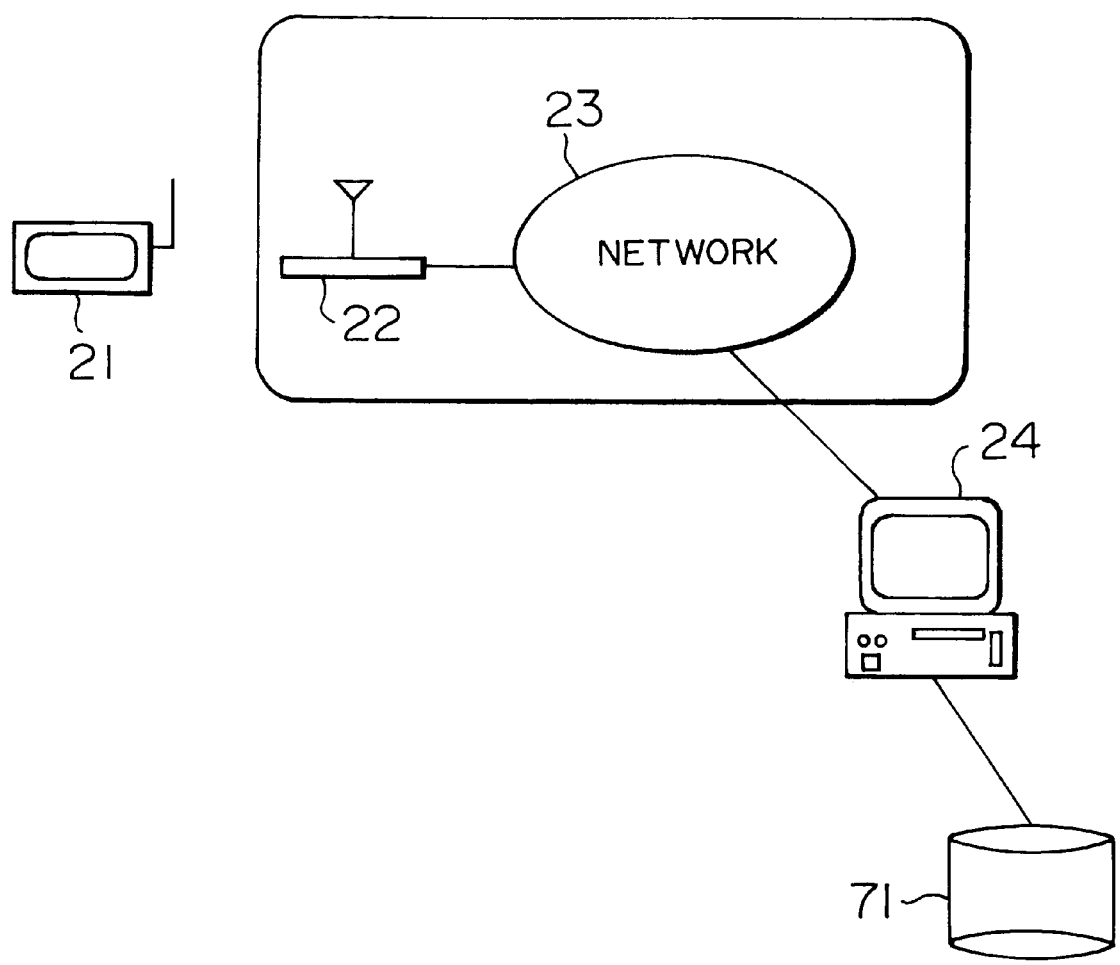
FIG. 8 is an illustration of an example of an arrangement of an information retrieval system based upon an information providing system according to this invention.

FIG. 8 shows an example of an arrangement of a system for carrying out the retrieval service to search the nearest shops, building or the like from the present location of the user. In this example, a database 71 retaining the location information on the shops, buildings and others is connected to the server 24. First, the user, retrieving the nearest bank, operates the input section 107 of the portable terminal 21 to input the kind of service for the request of searching the nearest bank. At this time, the CPU 101 sends the additional information including the kind of service as the request information to the server 24. As well as the above-mentioned case, the CPU 101 gets the base station ID number of the base station 22 and transmits it as the location information on the portable terminal 21 in addition to the identification number of the portable terminal 21.

On receiving the request agent from the user, the server 24 decides the present location of the portable terminal 21 on the basis of the location information included in the request agent. In addition, it judges the contents of the service on the basis of the service kind included in the request agent to make the database 71 retrieve the bank adjacent to the portable terminal 21. When obtaining as the reply information the information about the nearest bank from the database 71, the server 24 conveys the agent including this reply information to the portable terminal 21. The portable terminal 21 accepts the reply information from the server 24 and makes the display section 106 display the reply information. Whereupon, for example, a map indicating the location of the nearest bank is displayed as the reply information on the display section 106. The user can know the standing location of the nearest bank from this map.

Although in the above-described embodiment the present location is designed to be known on the basis of the ID number of the base station 22, the detection of the location thereof is also possible in such a manner as to receive the radio wave from the GPS (Global Positioning System).

Figure 9:
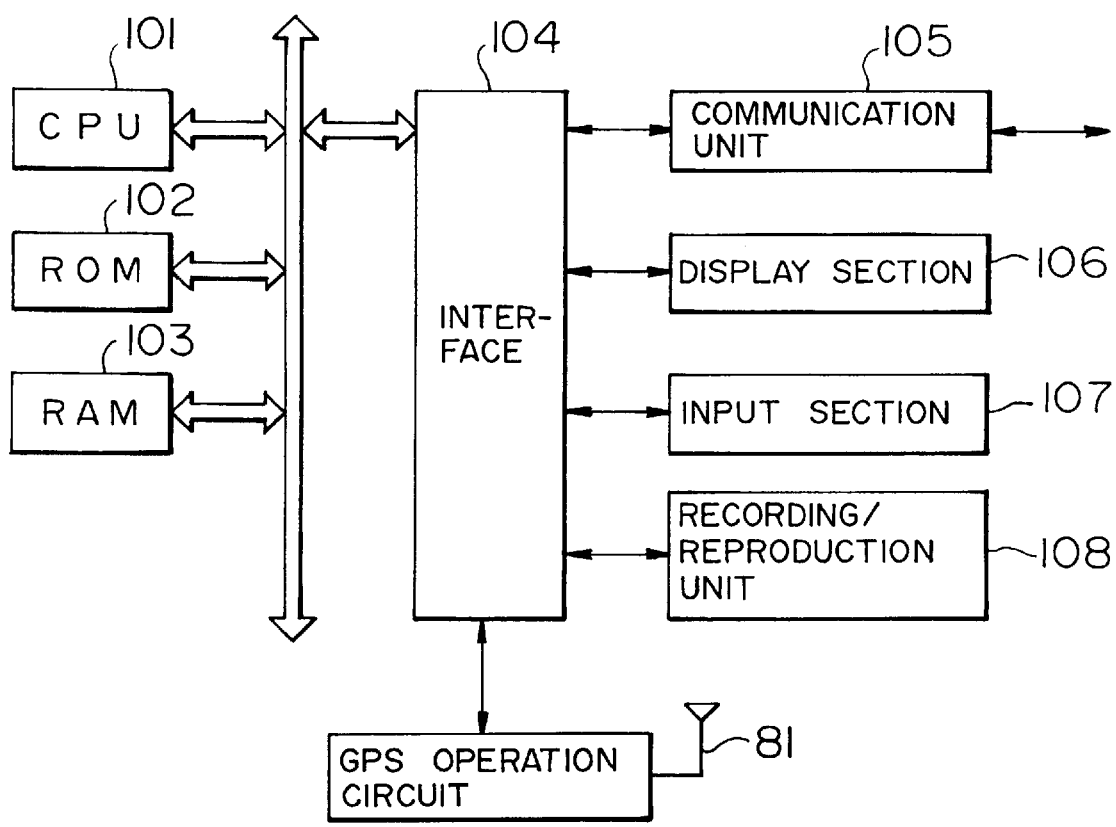
FIG. 9 is a block diagram showing another example of an arrangement of the portable terminal (21) of FIG. 1.

FIG. 9 is an illustration of an example of an arrangement of the portable terminal 21. In this arrangement, a GPS operation circuit 82 is in connection with the interface 104, and receives the GPS wave through a GPS antenna 81 to computing the present location (latitude and longitude) of the portable terminal 21 on the basis of the reception signal. The CPU 101 suitably transmits the location information obtained by the computation to the server 24.

Figure 10:
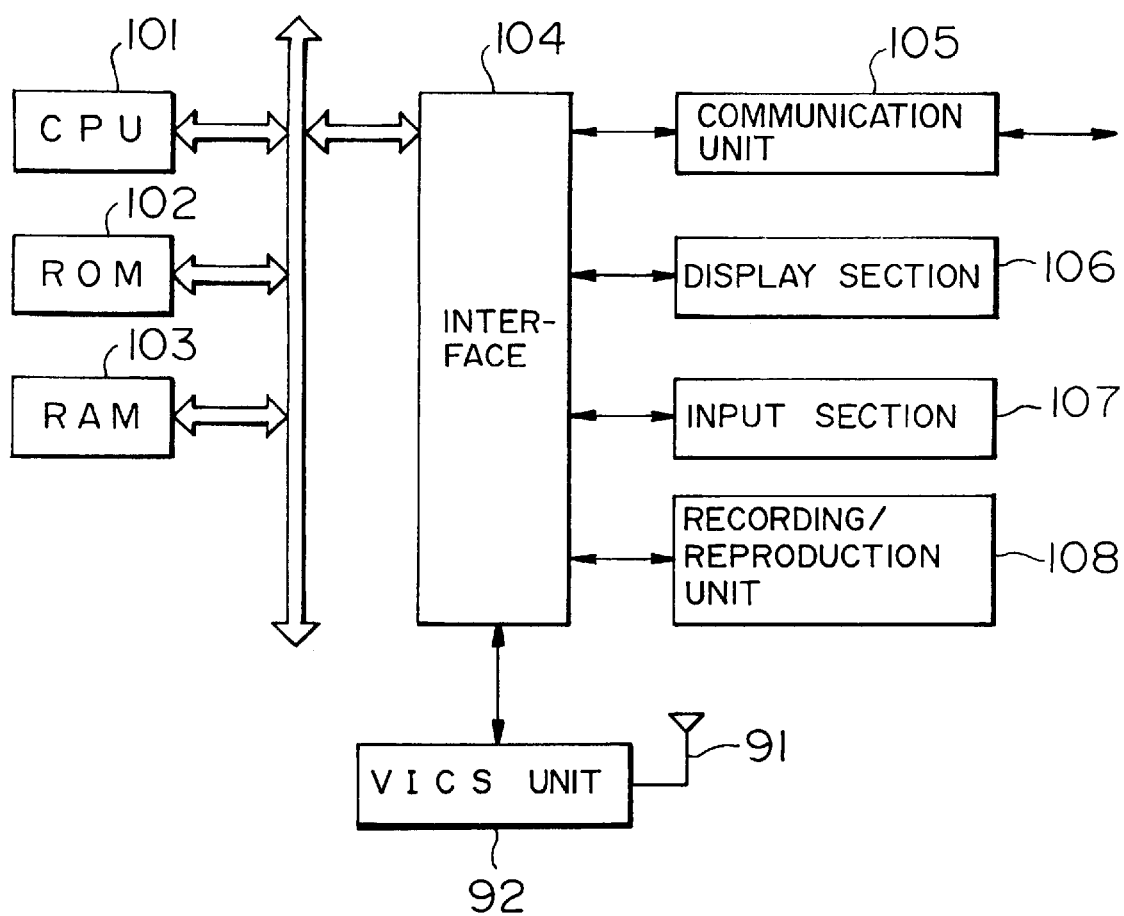
FIG. 10 is a block diagram showing a further example of an arrangement of the portable terminal (21) of FIG. 1.

Furthermore, in the portable terminal 21 as shown in FIG. 10, a VICS (Vehicle Information and Communication System) unit 92 equipped with a VICS antenna 91 is connected to the interface 104. This VICS unit 92 receives, through the VICS antenna 91, the radio wave emitted from a beacon located at a given position on a road to detect the location information. Although this VICS is originally a system which offers road traffic information at the real time, since the respective beacons transmit the information on their locations, the VICS can detect the present location of the portable terminal 21 on the basis of that location information. The location detection by this VICS is also possible in addition to the location detection by the GPS as shown in FIG. 9.

Figure 11:
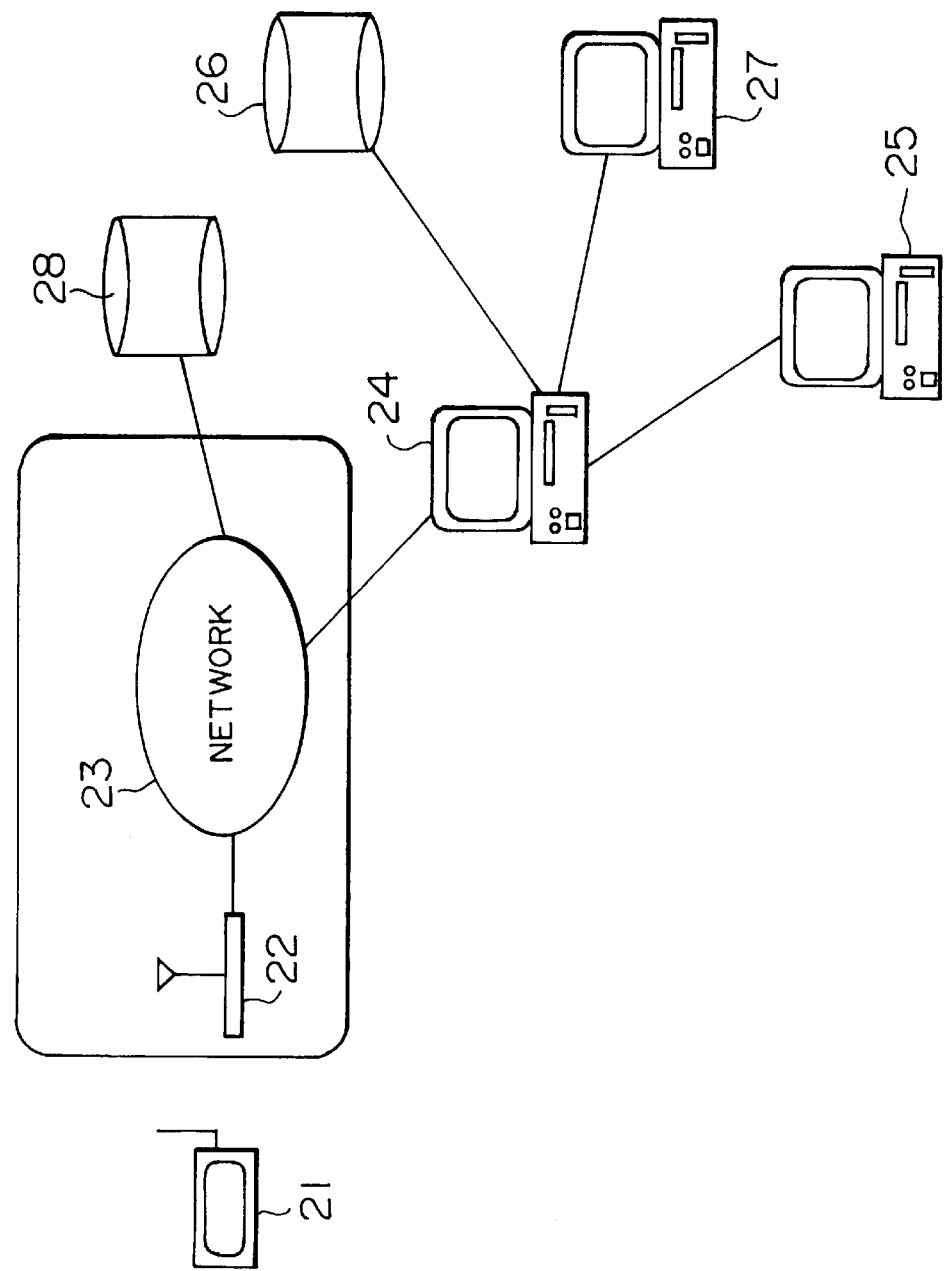
FIG. 11 is an illustration useful for describing the location registration of a portable terminal in a simplified portable telephone system.

FIG. 11 shows a further location detection method. In this example, a database 28 is connected to the simplified portable telephone system network 23. That is, even if the portable terminal 21 moves, the simplified portable telephone system network 23 detects the present location of the portable terminal 21 at a given interval to transfer the telephone call to the destination of the portable terminal 21, with this detection result being registered in the database 28. Further, in delivering a call signal to the portable terminal 21, the registered information in the database 28 is retrieved to detect the present location of the portable terminal 21. The call signal is fed from the base station 22 close to the detected location to that portable terminal 21.

When detecting the present location thereof, the CPU 101 of the portable terminal 21 has access to the database 28 to receive the location information registered therein. Further, it outputs the location information, attained from the database 28, as the present location of the portable terminal 21 toward the server 24. The server 24 contains a table showing the corresponding relation between the registered information in the database 28 and the absolute location and, referring to this table, derives the absolute location from the registered information in the database 28.

Let it be assumed that, for example, as shown in FIG. 12A, in the database 28 there are registered the numbers of the cover areas of the respective base stations and the IDs of the portable terminals 21 currently existing within the cover areas. At this time, for instance, the portable terminal 21 with the ID number "6111" lies within the cover area 2 and therefore the ID number is registered at the cover area 2. In cases where, for example, this portable terminal 21 moves into the cover area 1, the portable terminal ID number "6111" is registered at the cover area 1. That is, in the database 28 the ID number of the portable terminal 21 is registered at the area in which the portable terminal 21 is existing at that time.

On the other hand, as shown in FIG. 12B the cover areas and the position coordinates representative of the locations thereof are registered in the server 24 in the form of a table. In the case of this example, the ranges of the cover areas are expressed with the latitudes and the longitudes. For instance, when the database 28 transmits the information indicative of the fact that the portable terminal 21 with the ID number "6111" stands within the area, referring to the table as shown in FIG. 12B the server 24 judges that the portable terminal 21 with the ID number "6111" is positioned within the range of 35 degrees 55 minutes 15 seconds to 35 degrees 59 minutes 05 seconds of the north latitude and 132 degrees 16 minutes 10 seconds to 132 degrees 17 minutes 50 seconds of the east longitude.

Although in the above-described embodiment the client and the server are coupled through a dedicated line to each other, this invention is not limited to this arrangement.

As described above, in the information providing system according to this invention, the request information including the additional information indicative of the contents of the request is transmitted from the terminal to the server, and hence the user of the terminal can gain the reply information even if the user does not directly know the the other party from which the user requests the reply information. Accordingly, it is possible to lighten the burden to be applied to the user at the time of the service request. Since, in addition to the additional information, the location information and the identification number are further transmitted, the user can quickly and simply receive the necessary service at the user existing spot. Moreover, since the connection of communication line is established only while the information is transmitted from the terminal to the server or vice versa, it is possible to save the line use charge or the access charge.

Moreover, according to this invention, in the information providing system the server receives the request information including the additional information indicative of the contents of the request, and therefore, even if the user does not know the other party from which the user requests the reply information, the system can provide the reply information to that user. Thus, it is possible to provide information to more users, with the result that the efficiency in use of the information improve.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An information providing system comprising:

a server for offering given personalized information; and a terminal connected through a radio communication system to said server for receiving said personalized information, wherein said terminal is composed of:

detection means for detecting a location of said terminal;

transmission means for transmitting request information including location information corresponding to the location automatically detected and generated by said detection means, an identification number for identifying said terminal and additional information indicative of the contents of a request for personalized information to said server;

reception means for receiving personalized reply information responsive to said request information, including said location information, from said server; and control means for controlling said transmission means and said reception means.

2. An information providing system as defined in claim 1, wherein said radio communication system is a simplified portable telephone system, and said detection means detects as the location of said terminal an identification number of a base station of said simplified portable telephone system which is in connecting relation to said terminal.

3. An information providing system as defined in claim 1, wherein said detection means detects the location of said terminal stored in said radio communication system which is in connecting relation to said terminal.

4. An information providing system as defined in claim 1, wherein said transmission means temporarily disconnects the connection with said radio communication system until said reception means receives said reply information after it transmits said request information, while said reception means again establishes the connection with said radio communication system when receiving said reply information.

5. An information providing system comprising:

a server for offering given personalized information; and a terminal connected through a radio communication system to said server for receiving said personalized information, said server including:

reception means for receiving request information including location information automatically detected, generated and transmitted by said terminal indicative of a location of said terminal, an identification number for identifying said terminal and additional information representative of the contents of a request for personalized information, which is transmitted from said terminal;

judgment means for judging the contents of said request for personalized information of said terminal on the basis of said additional information and said location information of said request information; and transmission means for transmitting personalized reply information responsive to said request information on the basis of a judgment result by said judgment means.

6. An information providing system as defined in claim 5, wherein said server further includes:

request means for making a request for production of said personalized reply information to a separate information providing unit in accordance with the judgment result by said judgment means; and transfer means for transferring to said terminal said reply information responsive to the request of said request means from said different unit.

7. An information providing system as defined in claim 6, wherein said server further includes reply content judgment means for judging the contents of said reply information on the basis of said additional information included in said reply information from said separate information providing unit, and said transfer means transfers given information of said reply information on the basis of a judgment result by said reply content judgment means.

* * * * *